US010146598B1

(12) United States Patent
Pendry et al.

(10) Patent No.: US 10,146,598 B1
(45) Date of Patent: Dec. 4, 2018

(54) REACTOR PATTERN IN THE CLOUD

(71) Applicant: Google LLC, Mountain View, CA (US)

(72) Inventors: Jan-Simon Pendry, Morgan Hill, CA (US); Robert Sidebotham, Campbell, CA (US)

(73) Assignee: Google LLC, Mountain View, CA (US)

( * ) Notice: Subject to any disclaimer, the term of this patent is extended or adjusted under 35 U.S.C. 154(b) by 60 days.

(21) Appl. No.: 14/823,333

(22) Filed: Aug. 11, 2015

Related U.S. Application Data

(60) Provisional application No. 62/036,847, filed on Aug. 13, 2014.

(51) Int. Cl.
G06F 9/50 (2006.01)
G06F 9/54 (2006.01)

(52) U.S. Cl.
CPC ............ *G06F 9/542* (2013.01); *G06F 9/5005* (2013.01)

(58) Field of Classification Search
None
See application file for complete search history.

(56) References Cited

U.S. PATENT DOCUMENTS

| 4,323,966 | A | 4/1982 | Whiteside et al. | |
| 6,766,508 | B1 | 7/2004 | Isham | |
| 7,346,747 | B1 * | 3/2008 | Nussbaum | G06F 12/0815 711/150 |
| 7,398,533 | B1 * | 7/2008 | Slaughter | H04L 67/16 719/328 |
| 2003/0056028 | A1 * | 3/2003 | Underwood | G06F 9/465 719/328 |
| 2005/0278708 | A1 * | 12/2005 | Zhao | G06F 8/20 717/136 |
| 2006/0023642 | A1 * | 2/2006 | Roskowski | H04W 24/00 370/254 |
| 2012/0159429 | A1 * | 6/2012 | Villadsen | G06F 8/24 717/106 |
| 2014/0189703 | A1 * | 7/2014 | Gilder | G06F 9/50 718/104 |
| 2015/0348177 | A1 * | 12/2015 | Craft | G06Q 30/0645 705/307 |

* cited by examiner

*Primary Examiner* — Tuan C Dao
*Assistant Examiner* — William C Wood
(74) *Attorney, Agent, or Firm* — Lerner, David, Littenberg, Krumholz & Mentlik, LLP

(57) ABSTRACT

Technology for configuring a software job is described. An aspect of the technology involves receiving a software job including a plurality of events, each event including a request for processing, assigning the events to respective executors by matching the events with executor profiles, so that for each event the assigned executor is designated to perform the processing for the event, and selecting automatically an alternative executor to perform the processing for an event when the executor originally designated to perform the processing does not complete the processing.

16 Claims, 3 Drawing Sheets job:simple

- event:start: this event is posted during job creation (the job is created either directly via a user interface, or indirectly via a calendar service). The selected executor sets up the *named context*, context:sftp from provided job parameters and then posts the next event, event:ready_for_extract_and_transform.
- event:ready_for_extract_and_transform: the selected executor is responsible for doing the requisite data extraction and transformation, placing a reference to the resulting file in context:payload and then posting the next event, event:ready_for_delivery.
- event:ready_for_delivery: the selected executor pulls the delivery transport information from context:sftp and the payload from context:payload, delivers the file as directed, and then posts event:delivery_complete.
- event:delivery_complete is not responded to, so no further events area posted and the job ends.

FIG. 3

REACTOR PATTERN IN THE CLOUD

CROSS-REFERENCE TO RELATED APPLICATIONS

The present application claims the benefit of the filing date of U.S. Provisional Patent Application No. 62/036,847 filed Aug. 13, 2014, the disclosure of which is hereby incorporated herein by reference.

BACKGROUND

Unless otherwise indicated herein, the materials described in this section are not prior art to the claims in this application and are not admitted to be prior art by inclusion in this section.

The use of computers and computer software has become increasingly prevalent in numerous aspects of modern life. Further, computing is increasingly moving toward "cloud" implementations, in which it is treated as a service rather than a product. In cloud implementations, shared resources, software, and information are provided to computers and other devices as a utility over a network, typically the Internet.

BRIEF SUMMARY

It has been recognized that the advent of ubiquitous computing has given rise to a need to build, configure, deploy, and reliably operate complex software workflows with minimal system and management overhead. Such workflows should support a reliable transactional model and should be implemented using a simple programming model. Some workflows need to be long-running, that is they do not terminate normally. In addition workflow execution should continue to operate correctly and to completion in the face of system failures. Moreover, the software systems should provide an automatic, easily scalable execution environment that is transparent to the programming model.

The present technology is directed toward the recognized needs for efficient computing environments. In one aspect, the technology is intended to make it easier to create, configure and deploy software jobs by composing them from units of software called executors. Executors may react to requests for processing, or "events," that are introduced to the system, run anywhere, and may be built in any language. Further, the interface to each executor may be defined by an executor profile which may specify one or more triggering events for the executor, may optionally specify one or more contexts, and may optionally specify one or more postable events for the executor.

In one implementation, a software job lists the executor profiles that may be invoked by the job and specifies the context of the job. The job is then initiated by the posting of a start event, through either a user interface or a calendar service. Upon posting of the start event, an event manager matches the start event to one or more executor profiles included in the profiles listed for the job, and assigns an executor corresponding to a matching profile to perform the processing associated with start event. Upon completion of the start event, the executor that handles the start event may post the next event that is to be processed. Such posting of events and matching of events to profiles continues until job completion.

Configuring a software job in this manner provides many advantages. Among the advantages is superior fault tolerance. A software job configured according to the present technology will not crash when an executor assigned to an event fails. Rather, the event is automatically reassigned, either to the same executor, or to an alternative executor having a profile that matches the profile for the event. That is, when an executor of an event fails the executor may be retried, or a second executor having an executor profile listed in the job specification and matching the event may be substituted for the original executor.

Another advantage of the technology is scalability. The system can be modified without having to be taken out of service. For instance, new executors can be added at any time merely by specifying their profiles, and without interfering with the functioning of pre-existing executors or their profiles. In one implementation, a new executor is deployed with an interface that is defined by a new executor profile. In another implementation, a new executor is deployed with an interface that is defined by an existing executor profile. In the case of a new executor being deployed with an interface defined by an existing profile, the new executor may be used in a running job which lists the existing profile. Thus, for example, a new executor may be deployed to fix a bug affecting a long-running job. Moreover, the deployment of new software code corresponding to a new executor and specification of the new executor's interface are operations that may be decoupled in time. That is, deployment of new code may be performed before interface specification, after interface specification, or at the same time as interface specification, as long as the new code is deployed prior to actual use.

Several embodiments of the present technology will be discussed in detail below.

BRIEF DESCRIPTION OF THE DRAWINGS

FIG. 3 depicts an example of a software job and the events making up the job.

DETAILED DESCRIPTION

Examples of methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
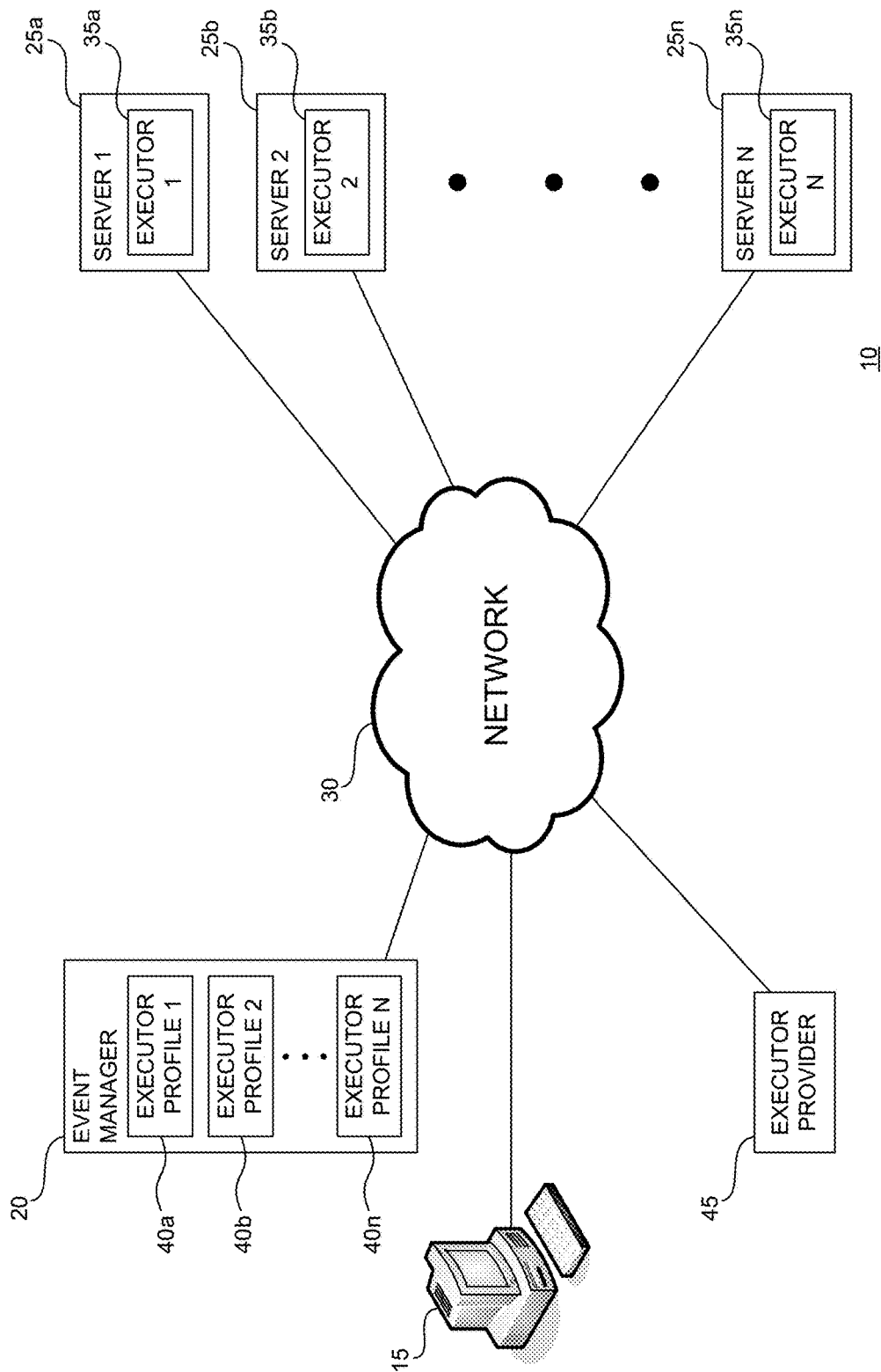
FIG. 1 is a diagram of a system according to the present technology.

FIG. 1 is a diagram of a system 10 according to the present technology. As can be seen from the figure, system 10 may include a user device 15, an event manager 20, servers 25a, 25b . . . 25n, executor provider 45, and a network 30. The servers 25a-n store respective executors 35a, 35b ... 35n, and the event manager 20 stores executor profiles 40a, 40b ... 40n, which respectively correspond to the executors 35a-n. The executors 35a-n are units of software, and for each executor the corresponding executor profile may specify a triggering event for the executor, a context, and a postable event for the executor.

Regarding the user device 15, event manager 20, and executor provider 45, it should be noted that each such element is not limited to a single device or a single location. That is, each such element may take the form of several devices, and those devices may or may not be geographically dispersed. Each of the elements is depicted as singular only for the sake of brevity of description, and should not be limited to being embodied by a single device or at a single location. For example, the event manager 20 may be implemented in the cloud, and as such, may be made up of software that runs on a multiple of platforms.

Regarding the executors 35a-35n and executor profiles 40a-n, it should be noted that in one possible embodiment such executors and profiles can only be provided by registered providers. For example, the registering of one or more executor providers can be carried out through the event manager 20 or some other device linked to network 30, or some combination of devices linked to the network, and for each registered executor provider a list of executor profiles supported by the provider can be stored in the event manager 20, device, or devices. As an example, FIG. 1 includes executor provider 45 for providing executors 35a-n and executor profiles 40a-n.

Regarding the storage of the executors 35a-n, it should be noted that servers 25a-n are used by way of example. Indeed, each executor may be stored in any type of device capable of performing the software function of the executor. For example, executors may be stored in any computing device that is capable of communicating with the event manager 20. These include, but are not limited to, a general purpose computer, a personal computer, a server, a cloud service, a mobile device such as a smart phone or a tablet, a wearable device such as a watch or glasses, any device in which a processor or computer is encapsulated such as a thermostat, a smoke detector, or other environmental sensor or controller, or a personal sensor such as for health monitoring or alerting, a car or other vehicle such as a self-driving car or a drone or other airborne vehicle. Moreover, executors 35a-n may be stored via a platform as a service, or via an infrastructure as a service.

Further, more than one executor may be stored in a single device, one or more executors may be stored in the event manager, and one or more executors may be stored in the user device 15. Still further, one or more executors may be stored in a divided fashion in more than one device, and may be distributed among a multiple of physical locations connected by a network. In one aspect, the executors provide "cloud" type service to user device 15.

The user device 15 may take the form of desktop computer, laptop computer, notebook computer, tablet computer, or mobile phone, but is not limited to such forms. The device 15 may be used to initiate a software job by posting a start event. In response to such posting, the event manager 20 matches the start event to one or more of the executor profiles 40a-n and dispatches the event to one of executors 35a-n corresponding to the matching profile. The one of executors 35a-n to which the event is dispatched performs the processing associated with the start event.

Upon completion of the start event, the one of executors 35a-n that processes the start event may post a next event that is to be processed. Such posting and processing of events continues until job completion. In one implementation, the retirement of an event and the event's posting of new events are performed in a single transaction, and if such transaction fails the executor processing the event will fail, causing the event to be re-dispatched, possibly to the same executor.

The operation of dispatching events to executors 35a-n can be performed via any suitable communication mechanism, synchronously, or asynchronously using a push or pull data transfer, or else via a notification mechanism which would then result in the executors 35a-n fetching the event details from the event manager 20. For example, each of executor profiles 40a-n may have an associated queue of pending events, and an event from the queue may be assigned by the event manager 20 to one of executors 35a-n that has an interface matching the executor profile.

For each event that is processed parameters are passed to and from the processing executor through the use of contexts. That is, each of the executor profiles 40a-n may include one or more contexts defining one or more parameters required by the corresponding executor. Further, each of the executor profiles 40a-n may include one or more contexts defining one or more parameters generated by the corresponding executor. Thus, if the processing of a given event requires a context or contexts, the chosen executor for that event must have a profile that specifies the context or contexts required by the executor's processing of the event, and if a given event generates a context or contexts, the chosen executor for that event may have a profile that specifies the context or contexts generated by the event. In one example of a job, a context generated by the final event of the job includes the desired results of the job.

A context is one or more values. In one implementation it is a collection of parameters with each parameter having a name and a value. A multiple of named contexts may be associated with a queue of pending events. In some cases, only the required named contexts are passed to an executor along with the event for processing—as declared in the executor profile. Should the executor post a new event, then all of the named contexts that were present prior to processing by the executor, and any named contexts newly created by the executor, will be accessible to the new event. Further, any named contexts returned by the executor will replace their original values.

Figure 2:
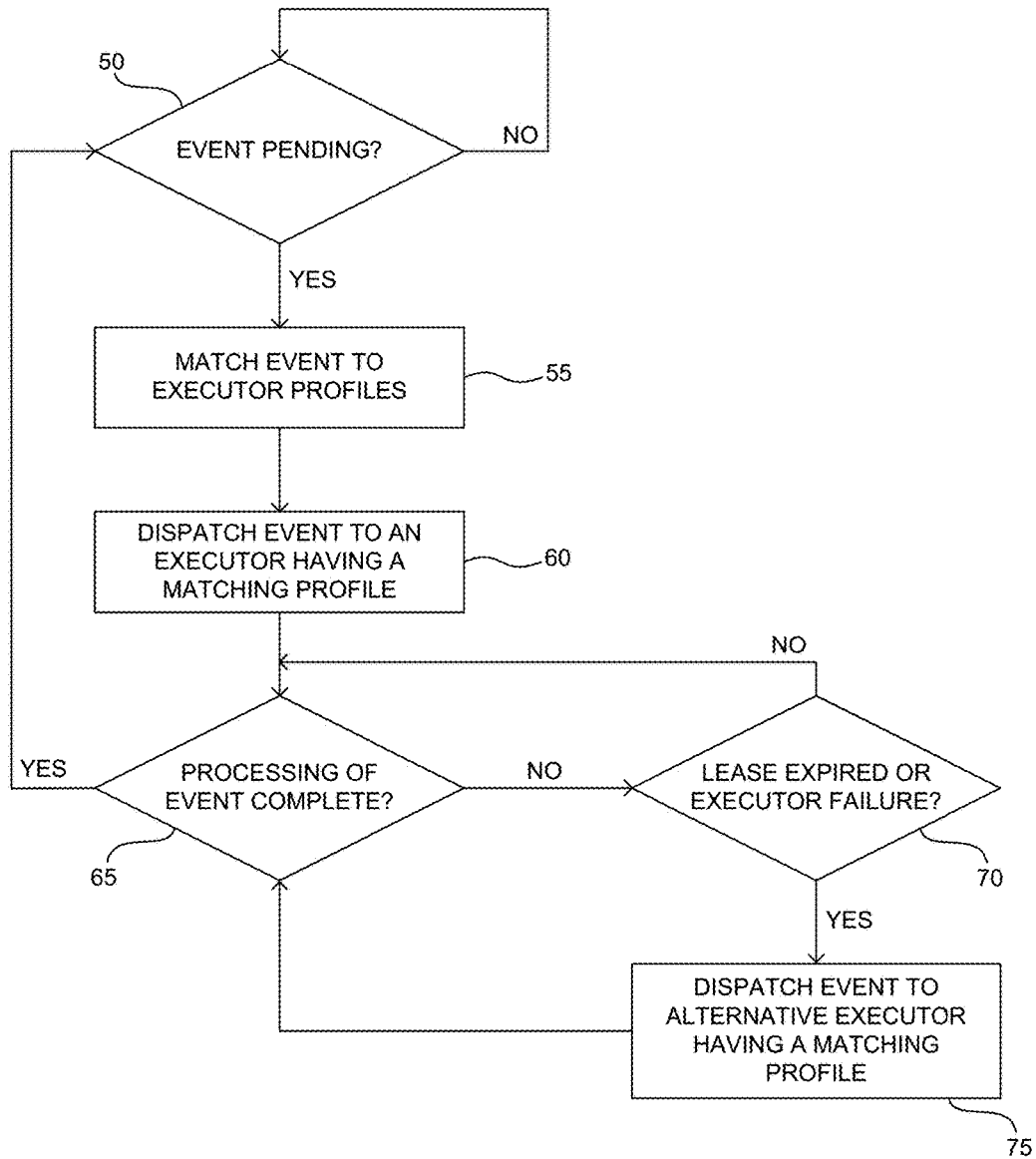
FIG. 2 is a flow chart showing the steps taken to implement a workflow.

Referring now to FIG. 2, there is shown a flow chart showing one possible embodiment of the steps taken by the event manager 20 to implement a workflow. As can be seen from FIG. 2, the workflow involves checking for pending events (step 50), matching a pending event to one or more executor profiles (step 55), dispatching the event to an executor having a matching profile (step 60), and waiting for the executor to which the event was dispatched to complete the processing associated with the event (step 65). In this manner, software jobs made up of a series of events may be processed by the workflow. The workflow "reacts" to events.

Matching an event to an executor profile includes matching the event to a triggering event specified by the executor profile. When an executor profile includes only a triggering event and the triggering event matches a pending event, the executor profile matches the pending event. Nevertheless, an executor profile may include one or more contexts in addition to the triggering event. Accordingly, matching a pending event to an executor profile may include, in addition to matching the profile's triggering event, matching one or more executor profile contexts to one or more pending event contexts. More generally, a pattern match is performed between pending events and executor profiles. Other items that may be considered during matching are particular values of context parameters and external facts such as time of day. In any case, the rules for matching a pending event to an executor profile may be specified in the executor profile.

When a pending event is matched to an executor profile, the executor corresponding to the matched profile may request or be granted an exclusive lease to the event for a finite period of time. In either case, if the executor is granted a lease the executor may be allowed to perform the processing of the event for a finite period of time, and if the executor does not complete the processing within the period of time the lease may be terminated. Accordingly, the workflow may include checking whether or not an executor's lease on an event has expired (step 70). The leasing of the event and the checking for lease expiration provides a mechanism for indicating that an executor is not functioning as expected or that the executor has crashed. In addition, the workflow may check for crashes apart from the lease mechanism (step 70). If an event lease expires or an executor crashes, the workflow involves dispatching the event to an alternative executor having matching profile (step 75) and then waiting for the alternative executor to complete the processing associated with the event (step 65). In this manner, executor failures can be handled efficiently and transparently.

It should be noted that numerous variations for the leasing of events will be apparent to one skilled in the art upon reviewing this disclosure. For example, under specified conditions an event lease may be periodically renewed. The renewal period may be a tunable parameter and may be chosen to enable discovery of executor failures. For instance, a renewal period for "n" seconds could be set for an executor that typically took "m" minutes to complete processing. In this manner, the status of the executor could be checked each renewal period, every "n" seconds, and renewal could be denied if the status indicates failure.

The renewal period may be determined by the executor provider 45. Moreover, the executor provider 45 may handle leasing on behalf of the executors 35*a-n*. In such implementation, the executor provider 45 may track a lease granted to one of executors 35*a-n* and either renew the lease or revoke the lease depending on whether the executor is performing correctly. In this way, the executor provider acts as a watchdog.

In addition, the event manager 20 may decline to renew a lease, in which case the executor provider 45 may shut down the executor. This may occur in the context of the event manager 20 preemptively stopping a job in response to an indication from a user or operator, or in response to an indication from a controlling device. For example, in a Thread-based implementation running on a conventional operating system, a user may command a job to stop, in which case the event manager denies renewal of the lease, and the executor provider 45 sends a request to the computer's operating system to terminate the thread.

Referring now to FIG. 3, there is shown an example of a software job and the events making up the job. The job shown in FIG. 3 may be designated by its uniform resource identifier (URI) which is, for example, urn:com.companyname.corp.ghr. integrations.job:simple. The job's URI acts as the name of the job's definition, which is recorded in persistent storage and is referenced by the job. The job of FIG. 3 is named using an abbreviated form of the URI, "job:simple." The events that make up the job, and the contexts used by the job, are similarly referred to by their URI abbreviations.

Regarding the naming of jobs, it should be noted that there are many alternatives to using URIs. The wide range of suitable naming mechanisms will be apparent to one skilled in the art upon review of this disclosure. Thus, while the job depicted in FIG. 3 is named by its URI, some other naming mechanism may be used, and the present technology is not limited to the use of URI names.

Referring back to FIG. 3, the work performed by job: simple is that of extracting data from a data base, transforming the data, writing the data to a file, and delivering the file. The job includes four events. The events are "event:start" 80, "event:ready_for_extract_and_transform" 85, event: ready_for_delivery" 90, and "event:delivery_complete" 95. The event:start event is posted during job creation, either directly via a user interface, or indirectly via a calendar service. The posted event:start is matched to an executor profile and is assigned to an executor corresponding to the matched profile. The executor assigned to event:start uses the name of the job definition to determine what the job will do, and generates a context "context:sftp" 100 based on job parameters specified by named contexts defined in the job definition. The context "context:sftp" specifies delivery transport information that will be used when the transformed data is delivered. The executor selected for event:start also posts the next event, event:ready_for_extract_and_transform 85.

The posted event:ready_for_extract_and_transform 85 is assigned to an executor. The executor extracts and transforms the requisite data, places the transformed data in a resulting file, and places a reference such as a uniform resource locator (URL) to the resulting file in a context "context:payload" 105, and then posts the next event, event: ready_for_delivery 90.

The posted event:ready_for_delivery 90 is assigned to an executor. The executor accesses the delivery transport information from context:sftp 100, accesses the transformed data by referring to context:payload 105, delivers the transformed data as directed by the delivery transport information, and then posts the next event, event:delivery_complete 95.

The posted event:delivery_complete 95 is the last event posted for the job. There is no executor profile listed in the job definition which will match event:delivery_complete 95, and therefore the event is not dispatched to an executor and no further work is done. The job ends after the posting of event:delivery_complete 95.

The job discussed in connection with FIG. 3 may be configured according to a program stored in a computer-readable medium. That is, an aspect of the present technology provides a tangible, computer-readable storage medium that includes instructions that, when executed by a processor, cause the processor to perform a method. The method includes, for example, receiving a software job having a plurality of events, each event including a request for processing, assigning the events to respective executors by matching the events with executor profiles, so that for each event the assigned executor is designated to perform the processing for the event, and selecting automatically an alternative executor to perform the processing for an event when the executor originally designated to perform the processing does not complete the processing.

Additionally, the present technology may be configured as follows.

(1) A method for configuring a software job, including receiving a software job having a plurality of events, each event including a request for processing; assigning the events to respective executors by matching the events with executor profiles, so that for each event the assigned executor is designated to perform the processing for the event; and selecting automatically an alternative executor to perform the processing for an event when the executor originally designated to perform the processing does not complete the processing.

(2) The method according to (1), wherein assigning an event to an executor includes granting the executor an exclusive lease to the event for a finite period of time.

(3) The method according to (1) or (2), wherein assigning the event includes periodically renewing the lease.

(4) The method according to any of (1) to (3), further including registering one or more executor providers, and for each registered executor provider, storing a list of executor profiles supported by the provider.

(5) The method according to any of (1) to (4), wherein each executor profile includes a triggering event and a context.

(6) The method according to any of (1) to (5), wherein at least one of the executor profiles further includes a postable event.

(7) The method according to any of (1) to (6), wherein at least one of the executors is distributed among a plurality of physical locations.

(8) The method according to any of (1) to (7), wherein at least one of the events is identified by a uniform resource identifier.

(9) A system for configuring a software job, including an event manager for receiving a software job having a plurality of events, each event including a request for processing, for assigning the events to respective executors by matching the events with executor profiles, so that for each event the assigned executor is designated to perform the processing for the event, and for selecting automatically an alternative executor to perform the processing for an event when the executor originally designated to perform the processing does not complete the processing; and one or more devices for storing the executors.

(10) The system according to (9), wherein the one or more devices for storing the executors are server computers.

(11) The system according to (9) or (10), further including a network coupling the event manager to the one or more devices for storing the executors.

(12) The system according to any of (9) to (11), wherein assigning an event to an executor includes granting the executor an exclusive lease to the event for a finite period of time.

(13) The system according to any of (9) to (12), wherein assigning the event includes periodically renewing the lease.

(14) The system according to any of (9) to (13), wherein one or more executor providers are registered in the system, and for each registered executor provider, the system stores a list of executor profiles supported by the provider.

(15) The system according to any of (9) to (14), wherein each executor profile includes a triggering event and a context.

(16) The system according to any of (9) to (15), wherein at least one of the executor profiles further includes a postable event.

(17) The system according to any of (9) to (16), wherein the system includes a plurality of devices for storing the executors, and at least one of the executors is distributed among two or more of the devices.

(18) The system according to any of (9) to (17), wherein at least one of the events is identified by a uniform resource identifier.

(19) A computer-readable medium having stored thereon a computer-readable program for implementing a method for configuring a software job, the method including receiving a software job having a plurality of events, each event including a request for processing; assigning the events to respective executors by matching the events with executor profiles, so that for each event the assigned executor is designated to perform the processing for the event; and selecting automatically an alternative executor to perform the processing for an event when the executor originally designated to perform the processing does not complete the processing.

(20) The computer-readable medium according to (19), wherein assigning an event to an executor includes granting the executor an exclusive lease to the event for a finite period of time.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A method for configuring a workflow to process a software job in a cloud computing environment using a plurality of executors each having an executor profile, comprising:
   receiving a software job comprising a series of events, each event comprising a request for processing;
   assigning a given event in the series of events to a respective executor, where the executor profile of the respective executor has a triggering event matching the given event and a context matching a context of the given event, wherein the context is a set of parameters required for processing the given event, so that the assigned executor is designated to perform the processing for the given event and to post a next event in the series of events for processing, including generating a new context for the next event, the next event being a postable event specified in the executor profile of the assigned executor; and
   selecting automatically an alternative executor to perform the processing for the given event when the executor originally designated to perform the processing does not complete the processing, where the executor profile of the alternative executor has a triggering event matching the given event and a context matching the context of the given event.

2. The method as recited in claim 1, wherein assigning an event to an executor comprises granting the executor an exclusive lease to the event for a finite period of time.

3. The method as recited in claim 2, wherein assigning the event comprises periodically renewing the lease.

4. The method as recited in claim 1, further comprising registering one or more executor providers, and for each registered executor provider, storing a list of executor profiles supported by the provider.

5. The method as recited in claim 1, wherein at least one of the executors is distributed among a plurality of physical locations connected by a network.

6. The method as recited in claim 1, wherein at least one of the events is identified by a uniform resource identifier.

7. A system for configuring a workflow to process a software job in a cloud computing environment using a plurality of executors each having an executor profile, comprising:
   an event manager configured for:
      receiving a software job comprising a series of events, each event comprising a request for processing,
      assigning a given event in the series of events to a respective executor, where the executor profile of the respective executor has a triggering event matching the given event, so that the assigned executor is designated to perform the processing for the given event and to post a next event in the series of events for processing, including generating a new context for the next event, the next event being a postable event specified in the executor profile of the assigned executor, and
      selecting automatically an alternative executor to perform the processing for the given event when the executor originally designated to perform the processing does not complete the processing, where the executor profile of the alternative executor has a triggering event matching the given event and a context matching the context of the given event; and
   one or more devices for storing the executors.

8. The system as recited in claim 7, wherein the one or more devices for storing the executors are server computers.

9. The system as recited in claim 7, further comprising a network coupling the event manager to the one or more devices for storing the executors.

10. The system as recited in claim 7, wherein assigning an event to an executor comprises granting the executor an exclusive lease to the event for a finite period of time.

11. The system as recited in claim 10, wherein assigning the event comprises periodically renewing the lease.

12. The system as recited in claim 7, wherein one or more executor providers are registered in the system, and for each registered executor provider, the system stores a list of executor profiles supported by the provider.

13. The system as recited in claim 7, wherein the system comprises a plurality of devices for storing the executors, and at least one of the executors is distributed among two or more of the devices connected by a network.

14. The system as recited in claim 7, wherein at least one of the events is identified by a uniform resource identifier.

15. A non-transitory computer-readable medium having stored thereon a computer-readable program for implementing a method for configuring a workflow to process a software job in a cloud computing environment using a plurality of executors each having an executor profile, the method comprising:
   receiving a software job comprising a series of events, each event comprising a request for processing;
   assigning a given event in the series of events to respective executor, where the executor profile of the respective executor has a triggering event matching the given event and a context matching a context of the given event, so that the assigned executor is designated to perform the processing for the given event and to post a next event in the series of events for processing, including generating a new context for the next event, the next event being a postable event specified in the executor profile of the assigned executor; and
   selecting automatically an alternative executor to perform the processing for the given event when the executor originally designated to perform the processing does not complete the processing, where the executor profile of the alternative executor has a triggering event matching the given event and a context matching the context of the given event.

16. The non-transitory computer-readable medium as recited in claim 15, wherein assigning an event to an executor comprises granting the executor an exclusive lease to the event for a finite period of time.

* * * * *